United States Patent [19]

Francken

[11] 4,151,892
[45] May 1, 1979

[54] MOTORIZED TERRESTRIAL SURF-BOARD

[76] Inventor: Frank Francken, Berkenlaan 4, 2610 Wilrijk, Belgium

[21] Appl. No.: 784,433

[22] Filed: Apr. 4, 1977

[30] Foreign Application Priority Data

Apr. 28, 1976 [BE] Belgium .................................. 254995

[51] Int. Cl.² ............................................. B60K 26/02
[52] U.S. Cl. ............................ 180/77 H; 74/471 XY; 74/478; 180/1 G; 280/87.04 A; 280/95 R; 280/265
[58] Field of Search ................ 180/77 R, 77 H, 1 G, 180/1 R; 280/87.04 R, 87.04 A, 87.04 B, 87.1, 265, 266, 220, 221, 11.11 E; 74/471 XY, 478

[56] References Cited

U.S. PATENT DOCUMENTS

| 1,364,471 | 1/1921 | Ameli | 280/221 |
|---|---|---|---|
| 1,526,330 | 2/1925 | Flitner | 280/87.1 |
| 2,667,939 | 2/1954 | Purkey | 280/87.1 X |
| 3,226,130 | 12/1965 | Smith | 280/266 X |
| 3,362,723 | 1/1968 | Bretholz | 280/221 |
| 3,437,161 | 4/1969 | Ufford | 180/1 R |
| 3,990,319 | 11/1976 | Hofer | 74/471 XY |

FOREIGN PATENT DOCUMENTS 344868 11/1936 Italy ........................................ 280/87.1

Primary Examiner—John P. Silverstrim
Attorney, Agent, or Firm—Bacon & Thomas

[57] ABSTRACT

The disclosure is of a sporting vehicle which is the combination of a frame mounted on at least three ground wheels two of which are steerable, a driving engine on the frame, a foot board tiltable about a transverse axis for controlling the speed of the engine and also tiltable about a longitudinal axis for steering the steerable wheels.

2 Claims, 9 Drawing Figures

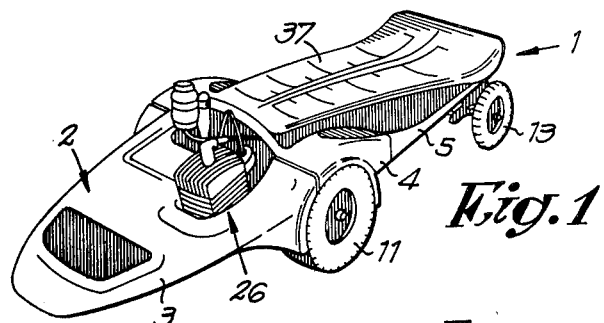
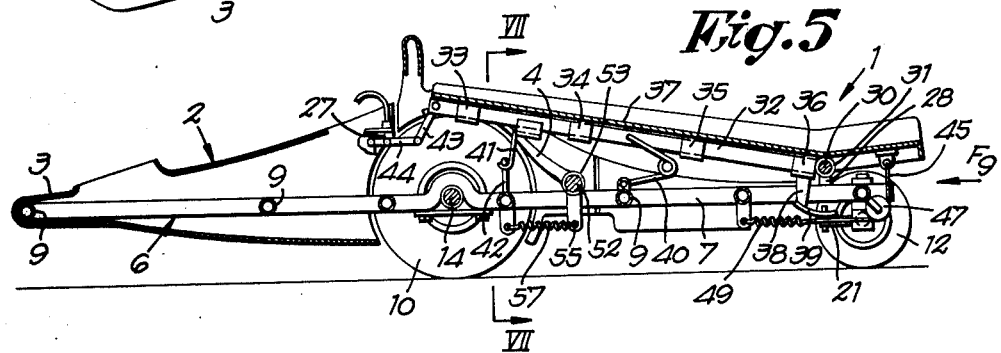
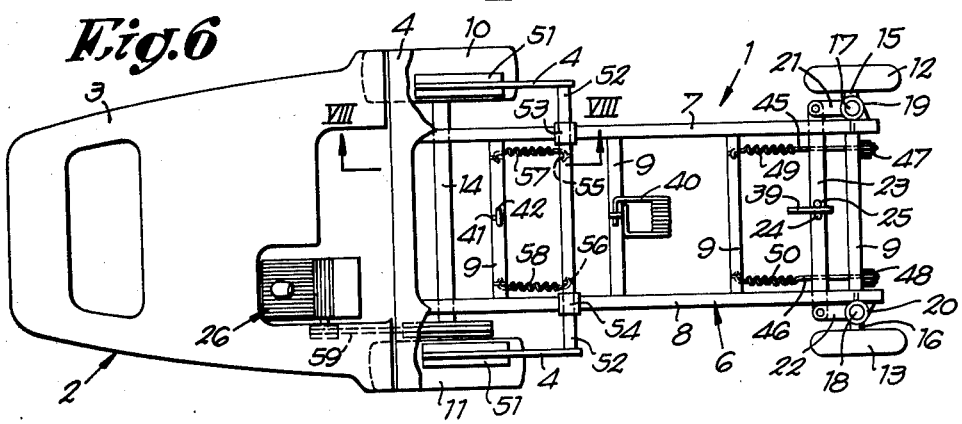
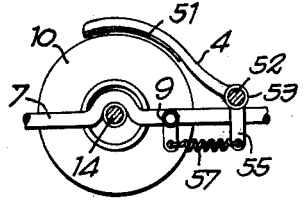
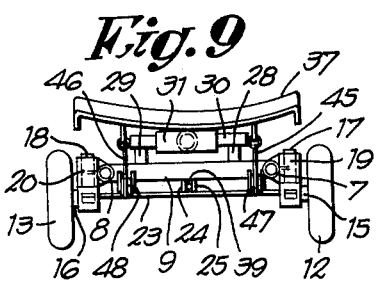

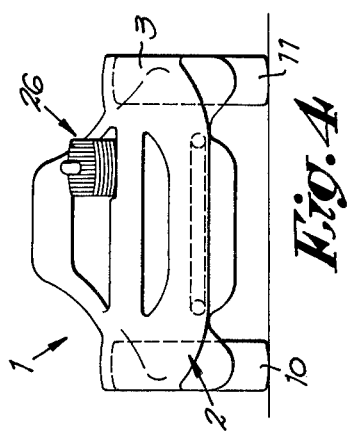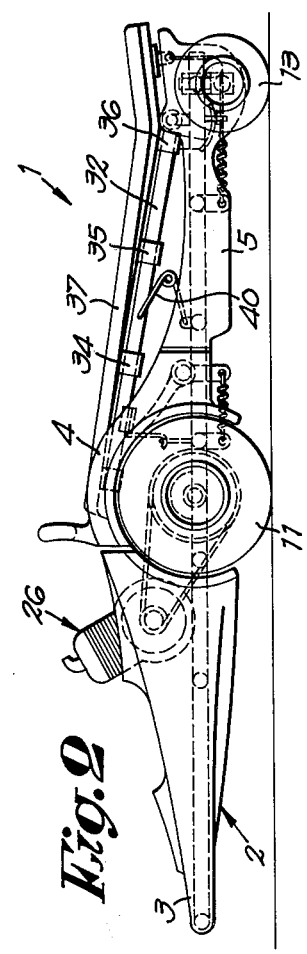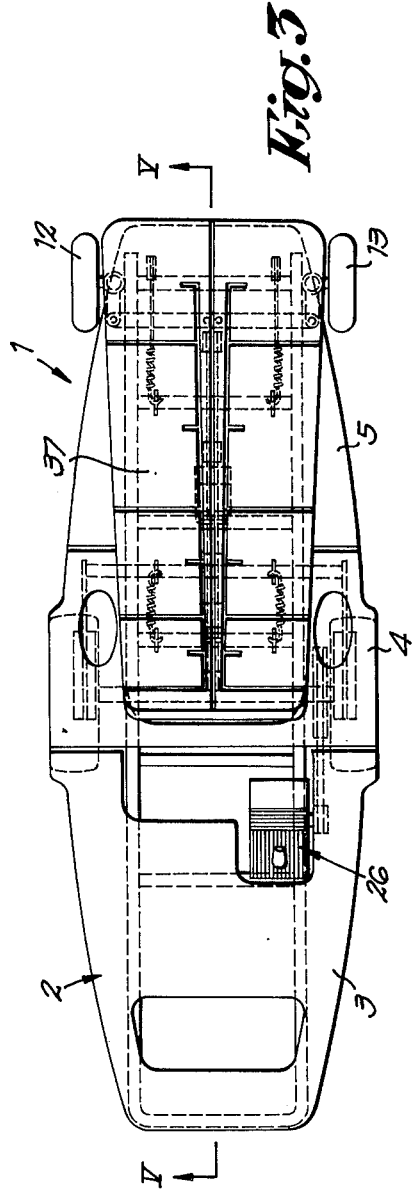

MOTORIZED TERRESTRIAL SURF-BOARD

This invention pertains to a motorized terrestrial surf-board of which the speed control as well as the steering are performed with the feet, and this in such a manner that the driver of such a vehicle must possess considerable skill and a great sense of balance.

For the facility of the reader, the term "monitorized terrestrial surf-board" will be replaced hereinafter by "sporting vehicle".

This sporting vehicle comprises the combination of a frame mounted on four wheels; a driving engine and means which are controlled by the feet from a position of balance in order, on the one hand, to control the speed of the vehicle and, on the other hand, to steer the vehicle.

In view of explaining more clearly the characteristics of the invention, but merely as an example and without the intent of limitation, a preferred form of embodiment will be described hereinafter with reference to the appended drawings in which:

FIG. 1 is a perspective view of a sporting vehicle according to the invention;

FIG. 2 shows a side view of FIG. 1;

FIG. 3 shows a top view of FIG. 2;

FIG. 4 shows a front view of FIG. 2;

FIG. 5 is a schematic section according to line V—V in FIG. 3;

FIG. 6 shows a partially cut-away top view of the device according to FIG. 5;

FIG. 7 shows a section according to line VII—VII in FIG. 5;

FIG. 8 shows a section according to line VIII—VIII in FIG. 6; and

FIG. 9 shows a schematic view according to arrow F9 in FIG. 5.

In this form of embodiment the vehicle 1 according to the invention comprises a bodywork 2 which in the present case is made up of three main parts, namely a front part 3, a central part 4 and a rear part 5, whereby this bodywork 3 to 5 is fixed in an appropriate but not shown manner to a general frame 6, consisting for instance of pipes and mainly of two side members, respectively 7 and 8, which are appropriately joined together by means of several cross-members 9.

The vehicle according to the invention progresses on four wheels respectively 10–11 and 12–13, whereby wheels 10 and 11 are not rotatably attached upon a shaft 14 which is fixed in some appropriate manner to frame 6, whereas the wheels 12 and 13 are each fitted rotatably upon horizontal shafts, respectively 15 and 16, which are integral with a vertical shaft, respectively 17 and 18, whereby the latter is fitted so as not to be able to move axially but to be free to rotate in bushings, respectively 19 and 20, which are attached in some appropriate manner to aforementioned frame 6, more particularly to side members 7 and 8.

To the part of shafts 17 and 18 which protrude below the bushings 19 and 20, rods are then attached, respectively 21 and 22, and these rods are hingedly linked together by means of a connecting rod 23 which is provided in its center with two vertical protrusions, respectively 24 and 25.

In the front part of the vehicle according to the invention, more particularly in part 3 of bodywork 2, an engine 26 is fitted, such as for instance an internal combustion engine which is fixed in some appropriate manner to aforementioned frame 6 and which is controlled, for instance, by means of a cable 27.

At the rear of aforesaid frame 6, for instance, two supports are attached, respectively 28 and 29, to which a shaft 30 is fitted. Upon this shaft 30, a freely rotating bushing 31 is for instance fitted, and this bushing is solidly attached to a shaft 32, located in the longitudinal vertical center plane of the device.

Next, bushings, respectively 33–34 35 and 36 are provided around shaft 32 and by means of which an appropriately shaped board 37, preferably of plastic material, is attached.

Board 37 can, on the one hand, perform a transverse rocking movement with shaft 32 as axis of rotation, and, on the other hand, perform a rocking movement in the fore and aft direction with afore mentioned bushing 31 as axis of rotation.

Attached to afore mentioned bushing 36 there is in this case a protrusion 38, which is extended towards the rear by a bent post 39 which extends between the two afore mentioned protrusions 24 and 25 of afore mentioned connecting or track rod 23. Furthermore there is provided between board 37 and frame 6 an appropriate spring 40 which constantly stresses board 37 upward, whereas further towards the front there are provided between frame 6 and shaft 32 certain means, in this case a hook 41 and an eyelet 42 which limit the rearword rocking movement of board 37.

Finally, the end of shaft 32 is hingedly connected by means of a pair of levers, respectively 43 and 44, in such a manner that the fore and aft rocking movement of board 37 acts upon throttle cable 27.

Towards the rear, board 37 is connected to two cables, respectively 45 and 46 which pass over pulley wheels, respectively 47 and 48, whereby said cables are further connected to springs, respectively 49 and 50 which are attached to a cross-member 9 of frame 6.

Finally, the vehicle according to the invention is provided with a braking system, which in its simplest form consists of the central part 4 of the bodywork 2 which, at the location of wheels 10 and 11, is provided with a brake lining 51. This part 4 is connected in an appropriate manner to a cross-shaft 52 extending from one side to the other and bearing in bushings 53 and 54 which are fixed upon frame 6. Shaft 52 is provided towards the bottom with protrusions, respectively 55 and 56 to which are connected springs, respectively 57 and 58 which, at their other end, are attached to a cross-member 9 or suchlike of frame 6.

The operation of the vehicle according to the invention as described above is very simple and as follows.

In order to drive this vehicle, one shall preferably take place on board 37 by putting one's feet approximately at the location of bushing 36, whereby one must attempt to keep one's balance so as to obtain that this board 37 does rock neither forward, nor backward, nor sideways. Next, should this not yet have been done, aforesaid engine 26 must be started, after which it will suffice to rock the board 37 forward, to make the engine turn faster so that also wheels 10 and 11 will be driven faster, for instance by an appropriate belt drive 59 from engine 26 to aforesaid shaft 14 or to rock the board 37 more towards the rear so as to reduce the speed of the vehicle according to the invention. By alternately rocking the board 37 towards the front and towards the rear, the speed of the vehicle can be altered at any moment.

These rocking movements of board 37 are obtained by the rotation of this board together with shaft 32 around shaft 30, whereby spring 40 more or less checks this movement, and the guiding, or respectively hooking device 41–42, ensures that board 37 remains attached to the vehicle.

In order to steer the vehicle according to the invention, it is sufficient, simultaneously with the control of the fore and aft rocking of board 37, also to rock this board with aforesaid shaft 32 as axis of rotation, with the result that post 39 is rocked either to the left or to the right, and consequently swerves the wheels 12 and 13 via interconnecting rod 23 and rods 21 and 22.

In order to absorb or dampen any sudden transverse rocking movements of board 37, afore mentioned springs 49 and 50 have been fitted.

It is quite obvious that in this manner a device is obtained which, on the one hand is driven, and on the other hand is steered, by the skill and the sense of balance of the rider who has taken place with his feet on board 37.

To apply the brakes it will by sufficient for the rider of the vehicle to place at least one foot on part 4 of the bodywork, so that the linings 51 rub on tires 10 and 11.

Although in this example the speed of the vehicle is controlled by the feet, it is perfectly obvious that the speed of the vehicle might just as well be controlled in some other way, such as for instance by a hand controlled throttle cable.

It is quite clear that the present invention is by no means limited to the form of embodiment described an example and illustrated in the appended drawings, but that such a vehicle may be built in many various shapes and dimensions without going beyond the scope of the invention.

What I claim is:

1. A sporting vehicle comprising:
    a frame having at least three wheels thereon, two of which are mounted for steering motion on said frame and a steering mechanism;
    a driving engine on said frame and having a speed control means;
    a transverse shaft fixed on said frame;
    a first bushing rotatable on said transverse shaft;
    a longitudinally extending shaft fixed to said first bushing;
    a board;
    at least two second bushings mounted on said board intermediate its ends, said second bushings rotatably mounted on said longitudinally extending shaft;
    one of said second bushings having a downwardly extending protrusion extending to said steering control mechanism whereby lateral tilting of said board around said longitudinally extending shaft effects steering movement of said two wheels; and
    said longitudinally extending shaft being coupled to said speed control means for controlling the speed of said engine in response to tilting of said board and longitudinally extending shaft about said transverse shaft.

2. A sporting vehicle as defined in claim 1 wherein said two wheels are each journalled on means carried by upstanding axles each of which has a transverse lever and a connecting rod pivoted to each of said levers and having protrusions and comprising said steering control mechanism; said downwardly extending protrusion engaging between said protrusions of said connecting rod;
    said board being of shallow upwardly concave shape in transverse section and of shallow V-shape in the fore and aft direction, the rear arm of the V being shorter than the front arm thereof.

* * * * *